(12) United States Patent
Trappeniers et al.

(10) Patent No.: US 8,046,462 B2
(45) Date of Patent: Oct. 25, 2011

(54) METHOD, COMPUTER SOFTWARE PRODUCTS, CLIENT TERMINAL, NETWORK ELEMENT AND NETWORK FOR EFFICIENT USE OF NETWORK RESOURCES BY JUST-IN-TIME MODULATION OF QUALITY OF SERVICE BASED ON SERVICE USAGE AND USER BEHAVIOR

(75) Inventors: Lieven Leopold Albertine Trappeniers, Herentals (BE); Marc Bruno Frieda Godon, Londerzeel (BE)

(73) Assignee: Alcatel Lucent, Paris (FR)

( * ) Notice: Subject to any disclaimer, the term of this patent is extended or adjusted under 35 U.S.C. 154(b) by 2790 days.

(21) Appl. No.: 10/616,980

(22) Filed: Jul. 11, 2003

(65) Prior Publication Data

US 2005/0262228 A1 Nov. 24, 2005

(30) Foreign Application Priority Data

Jul. 17, 2002 (EP) .................................... 02360213

(51) Int. Cl.
*G06F 15/16* (2006.01)
(52) U.S. Cl. ........................................ 709/226; 709/228
(58) Field of Classification Search .......... 709/223–226, 709/228
See application file for complete search history.

(56) References Cited

U.S. PATENT DOCUMENTS

| | | | | |
|---|---|---|---|---|
| 6,125,105 A * | 9/2000 | Edwards et al. | ............... | 370/230 |
| 6,208,640 B1 * | 3/2001 | Spell et al. | ..................... | 370/358 |
| 6,404,738 B1 * | 6/2002 | Reininger et al. | ............ | 370/236 |
| 6,680,922 B1 * | 1/2004 | Jorgensen | ..................... | 370/328 |
| 6,728,748 B1 * | 4/2004 | Mangipudi et al. | ........... | 718/105 |
| 6,760,344 B2 * | 7/2004 | Mizell et al. | ................... | 370/475 |
| 2004/0202159 A1 * | 10/2004 | Matsubara et al. | ........... | 370/389 |
| 2007/0038752 A1 * | 2/2007 | Jorgensen | ..................... | 709/226 |

FOREIGN PATENT DOCUMENTS

| | | |
|---|---|---|
| EP | 0 883 075 A2 | 12/1998 |
| EP | 1 021 015 A2 | 7/2000 |
| EP | 1 158 740 A1 | 11/2001 |
| EP | 1 202 528 A2 | 5/2002 |
| WO | WO 99/44335 A2 | 9/1999 |
| WO | WO 01/50278 A1 | 7/2001 |

OTHER PUBLICATIONS

International Telecommunication Union, ITU-T E.800, Telephone Network and ISDN, Quality of Service, Network Management and Traffic Engineering, Terms and Definitions Related to Quality of Service and Network Performance Including Dependability, Aug. 1994, pp. 1-53.

(Continued)

*Primary Examiner* — David Lazaro
(74) *Attorney, Agent, or Firm* — Sughrue Mion, PLLC

(57) ABSTRACT

The invention relates to observing requests, deriving quality of service (QoS) demands and scheduling the network's resources in terms of QoS. A scheduler is modulating the QoS based on service usage and user-behavior just-in-time. It relates to a method for efficient use of network resources by just-in-time modulation of quality of service based on real-time service-usage and user-behavior comprising steps recording events, generating a synthesis of user-behavior for a QoS user profile according to QoS user preferences, predicting required QoS demand based on current user behavior and user QoS profile, according to QoS user preferences, deriving and propagating QoS demands and allocations, and co-ordination of QoS request of a manifold of users, based on requests, QoS user profiles, QoS user preferences and resources. Further it relates to computer software product, client terminals, a scheduler server, a network element, and a network.

12 Claims, 3 Drawing Sheets

OTHER PUBLICATIONS

James Won-Ki Hong, et al: "A COBRA-Based Quality of Service Management Framework for Distributed Multimedia Services and Applications", IEEE Network, IEEE Inc. New York, US, vol. 13, No. 2, Mar. 1999, XP-000875023, pp. 70-79.

* cited by examiner

METHOD, COMPUTER SOFTWARE PRODUCTS, CLIENT TERMINAL, NETWORK ELEMENT AND NETWORK FOR EFFICIENT USE OF NETWORK RESOURCES BY JUST-IN-TIME MODULATION OF QUALITY OF SERVICE BASED ON SERVICE USAGE AND USER BEHAVIOR

BACKGROUND OF THE INVENTION

1. Field of the Invention

The present invention relates to modulation of quality of service (QoS) in access networks. The invention is based on a priority application, EP 02360213.9, which is hereby incorporated by reference.

2. Background

Many sophisticated emerging applications, such as video streams, multimedia conferencing, or distributed virtual reality deploy in today's internetworking infrastructure. The main due requirement that all these applications share is the need for (guaranteed) quality of service (QoS) such as high bandwidth, delay, and jitter delay etc.

The ITU-T E.800 (08/94) recommendation introduces into the QoS concept on page 1 to 4 and defines there areas that affect the QoS. This recommendation describes factors that contribute collectively to the overall quality of service as perceived by the user of a telecommunication service. The user's degree of satisfaction of the quality of service can be divided into service performance areas like support, operability, servability, and security. It defines QoS as the collective effect of service performance which determines the degree of satisfaction of a user of the service.

Service providers that offer services with a guaranteed quality require management systems that can retrieve, calculate and present QoS data from the four performance areas. These management systems have to control the Service Level Agreements (SLA), between the consumers and the provider, and react on service quality violations according to business rules. Today there exist products to manage this, but no standards or de-facto standards exist to facilitate the integration of a QoS management system with other management systems such as mediation, billing and service activation as part of a total management solution.

The QoS requirements are typically specified in terms of bounds, e.g., the worst case end-to-end delay or the maximum bandwidth. Other parameters may be specified as well.

On the other hand the networks have limited resources with respect to quality of service. The resources are shared between consumers.

Today the resources are allocated mainly statically by consumers, e.g. according to a business model. There are colored services (gold, silver, bronze) available, where per connection at connection set-up a static type of QoS is chosen. From telephony an optimization is known, minimizing cost by choosing a subscription-type (provider), e.g., by a call-by-call prefix or user-preferences, at subscription time. Another example is the subscription-type (billing) to user-preferences in mobile communication. There is no cost reduction and no change of QoS at this moment, only billing is adapted while QoS remains.

This QoS management is of rather static type, configured administratively at subscription time. Changing the QoS and price of the subscription is an administrative task. The granularity of this approach is limited to the connection-setup, rather than the requirements of applications that use them.

This prior art has some major disadvantages. It does not take into account the cost for operator. Effectively no change of QoS, only billing is adapted while QoS remains the same.

The approaches with respect to change are limited. Typically a user can change subscription mode 2 or 3 times. And the granularity is limited to a connection, instead of services or finer granularity. The QoS adaptation is triggered by user, based on match between preferences and behavior of the service. The user has to make the matching judgement himself.

Especially today's broadband access networks lack dynamic subscription types. There are static subscription types dealing with the connection as a whole. Typically, at subscription-time, the user chooses a type gold versus bronze and this type is not changed thereafter. If the user wants to use demanding services, he or she will have to change his or her entire connectivity subscription impacting all services and all family members.

FIG. 1 to FIG. 5 explain the current problems and the proposed solution. For a gold service, the end-user will pay a lot of money to have, e.g. a high bandwidth available at all times, satisfying most of his needs. Although the operator will have significant revenues, he will have to provision a lot of unused bandwidth.

For a bronze service, the end-user will have a cheap subscription that will limit the networking performance. An upgrade from bronze to gold will be expensive and will be a time-consuming administrative task.

Therefore it is necessary to provide a method for quality of service, e.g. bandwidth, allocation in an highly adaptive way.

Such a method for allocation of bandwidth in a predictive fashion is known from the international patent application WO 99/44335. There packets are identified with particular data streams and characteristics of the data streams are used to predict probable future bandwidth requirements. Such predictions are used to allocate high-bandwidth channels and to close or switch channels as in accordance with predicted needs. Preferably the system is self-learning and can modify a rules base for making allocation decisions e.g. based on actual use statistics.

European Patent EP 1 202 528 describes a development in the direction from a user's perspective instead of the technical view in terms of bandwidth, namely a browser-based monitoring system and method. A browser operable with a user's Internet-compliant device is provided for launching a transaction session, wherein a media-based parametric detector is associated with the browser in order to track a plurality of media-based parameters and metrics generated during the transaction session. The media-based parameters and metrics are effectuated at least in part due to the user's interaction with the browser with respect to the transaction session. A reporting structure is provided in association with the browser for reporting the media-based parameters and metrics to an Internet entity for effectuating an IP-based service.

European Patent Application EP 1 158 740 relates to a framework for achieving cross-adaptability by providing components for QoS management in the communication network(s) by means of a component coordinator unit and targets the uniformity problem.

European Patent Application EP 1 021 015 discloses a network-device control system for controlling a network device by acquiring user priority or application priority and, controlling in accordance with the priority.

The article, A CORBA-BASED QUALITY OF SERVICE MANAGEMENT FRAMEWORK FOR DISTRIBUTED MULTIMEDIA SERVICES AND APPLICATIONS' IEEE NETWORK, IEEE INC. NEW YORK, US, vol. 13, no. 2, March 1999 (1 999-03), pages 70-79, XP000875023 ISSN: 0890-8044 addressed issues of QoS management services in distributed multimedia services and applications. The article provides an end-to-end QoS management called the QoS management framework. A key component of this framework is the QoS Management Service Object, which orchestrates resources at endpoints, coordinating resource management across layer boundaries. Services such as translation, monitoring, admission, and negotiation are provided by the QoS Management Service Object allowing dynamic negotiation and renegoation of QoS by users.

A further method and apparatus for a variable bandwidth experience for an end-user is described in the international patent application WO 01/50278.

It is a problem to provide network resources uniformly in terms of the above mentioned QoS efficiently in order to satisfy the real demand of customers, i.e. from a user's perspective instead of the technical view in terms of bandwidth, as good as possible. In order to solve this situation one has to schedule the network resources, i.e. the QoS, with respect to the requests and expectations of the users.

Objects and Advantages of the Invention

This problem is solved by a method for allocating network resources by just-in-time modulation of quality of service (QoS) comprising steps of
  recording QoS demands and resource usage,
  predicting required QoS demands,
  deriving and propagating QoS demands, and
  coordinating concurrent QoS demands of a manifold of users,
where recording QoS demand and predicting required QoS demand is based on service-usage and user-behavior acquired by recording events at a client terminal of a user as user-behavior and aggregated in a QoS user profile.

The problem is also solved by a telecommunication network comprising a client terminal and a scheduler server, said client terminal comprising communication means for requiring and using network resources and quality of service (QoS) demands, said scheduler server comprising scheduling or dispatching means allocating network resources based on QoS demands, wherein the client terminal further comprises acquiring means for recording events of a user as user-behavior and aggregation means for aggregating user-behavior in a QoS user profile, and wherein the communication means comprises demanding means for demanding predicted quality of service (QoS) demands based on service-usage and said user-behavior, and wherein said scheduling or dispatching means comprises coordinating means for coordinating concurrent QoS demands of a manifold of users and evaluation and balancing means for evaluating QoS demands and balancing QoS grants based on QoS user profile comprising aggregated service-usage and user-behavior received from a client terminal.

The problem is further solved by a client terminal comprising communication means for requiring and using network resources and quality of service (QoS) demands, wherein the client terminal further comprises acquiring means for recording events of a user as user-behavior and aggregation means for aggregating user-behavior in a QoS user profile, and wherein the communication means comprises demanding means for demanding predicted QoS demands based on service-usage and said user-behavior.

The problem is also solved by a scheduler server comprising scheduling or dispatching means allocating network resources based on QoS demands, wherein said scheduling or dispatching means comprises coordinating means for coordinating concurrent QoS demands of a manifold of users and evaluation and balancing means for evaluating QoS demands and balancing QoS grants based on QoS user profile comprising aggregated service-usage and user-behavior received from a client terminal.

Finally, the problem is also solved by a computer software product for allocating network resources by just-in-time modulation of quality of service (QoS), such a computer software product comprising programming means for performing the method according to claim 1.

The invention comprises observing resource requests and user behavior and deriving QoS demands and scheduling the network's resources in terms of QoS, accordingly. A scheduler is modulating the QoS based on service usage and user-behavior just-in-time. Modulation, here, is a varying of QoS with respect to need of QoS. From now on the term adaptation of QoS is used for QoS modulation synonymical.

User behavior is recorded based on the individual event stream and a prediction of required resources, e.g. bandwidth, delay, etc. is performed. The resources are scheduled by the expected or predicted demand accordingly. The adaptation of the QoS might be based on an analysis of user-behavior and a synthesis stored, e.g. in a user's profile. The modification of QoS settings might be made transparent to the user. The user might be involved when increasing QoS, e.g. bandwidth temporarily, and possibly pay accordingly.

The invention comprises advantageous scheduling scenarios, where the modulated QoS is triggered by service selection, where the QoS is modulated predictively, and where QoS settings are transparent to the user, and where the user is involved interactively.

Objects and Advantages of the Invention

The invention is a method for efficient use of network resources by just-in-time modulation of quality of service (QoS) based on service-usage and user-behavior, a QoS user profile according to defined QoS user preferences comprising the steps of
  recording events at a client terminal of a user as user-behavior,
  generating a synthesis of user-behavior into the QoS user profile,
  predicting required QoS demand based on current user behavior and QoS user profile,
  deriving and propagating QoS demands and grants, and
  co-ordination of QoS demands of a manifold of users, based on QoS demands, QoS user profiles, QoS user preferences, and available resources.

The invention also comprises a computer software product (client-module) for efficient use of network resources by just-in-time modulation of QoS based on service-usage and user-behavior, handling QoS user profiles and/or QoS user preferences at a client terminal. The Computer Software Product might derive user-behavior based on recording events for a user at a client terminal and generate a synthesis for a QoS user profile. Independently it might predict the required QoS demand based on current and recorded user-behavior and/or user QoS profile information and QoS user preferences, e.g. realized by a neuronal network.

The invention further comprises a computer software product (scheduler-module) for efficient use of network resources by just-in-time modulation of QoS based on service-usage and user-behavior for evaluating, balancing, and propagating the QoS demands based on resource requests, QoS user profiles, QoS user preferences, and resource availability.

The invention is furthermore a computer software product (network-element-module) for efficient use of network resources by just-in-time modulation of QoS based on service-usage and user-behavior that serves QoS allocations and propagates QoS demands.

The object of the invention is furthermore for connecting a client terminal with a network comprising a QoS user profile comprising an event log reflecting resource requests and a synthesis of user behavior. The client terminal might comprise a QoS user preferences comprising defined QoS strategies for each dedicated service. The client terminal might comprise a user interface for making the on-line (real-time) modification of QoS settings transparent to the user and means for involving the user in the decision of demanding QoS.

The object of the invention is also to provide a scheduler server for efficient use of network resources by just-in-time modulation of QoS based on service-usage and user-behavior comprising scheduling or dispatching means for evaluating and balancing, the QoS demands and propagating the QoS grants based on resource requests, QoS user profiles, QoS user preferences, and resource availability.

The invention is also a network element for efficient use of network resources by just-in-time modulation of QoS based on service-usage and user-behavior that comprises propagating and allocating means for serving QoS grants and propagating QoS demands and QoS grants.

Further, the invention is a network for efficient use of network resources by just-in-time modulation of QoS based on service-usage and user-behavior comprising at least one client terminal providing QoS demands, QoS-user-profiles, and QoS-user-preferences, at least one scheduling server providing QoS grants by evaluating, balancing QoS demands with QoS resources, and propagating the QoS demands, based on QoS user profile information and QoS user preferences, and network elements serving QoS grants and propagating QoS demands and QoS grants.

Accordingly, it is an object and advantage of the present invention to adapt QoS based on a fine granularity to simulate a high performance-network. The adaptation reduces costs/effort for end-users and operators by using network resources efficiently.

Another advantage of the present invention is that the user does not have to make the judgment about the QoS himself.

A further advantage of the present invention is that the proposed scenario has a finer granularity for QoS changes: services instead of connection, users instead of subscriber, real-time instead of only once, modulated instead of fixed.

Yet another advantage of the present invention is that end-users only pay a cheap subscription with an extra comfort service and receive a high quality user-experience, even with this moderate subscription. Operators can dimension their networks more accurately, while generating extra revenue streams from users that normally would take cheap subscriptions.

These and many other objects and advantages of the present invention will become apparent to those of ordinary skill in the art from a consideration of the drawings and ensuing description.

DETAILED DESCRIPTION OF THE INVENTION

Figure 1:
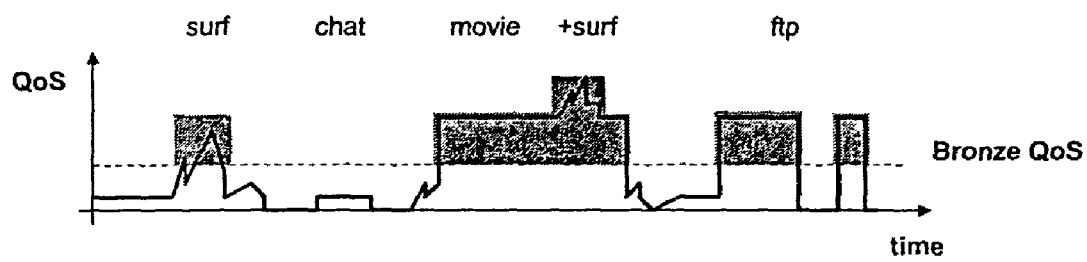
FIG. 1 is a schematic diagram of a prior-art method for allocating network resources illustrating the problem with a Bronze QoS.
Figure 2:
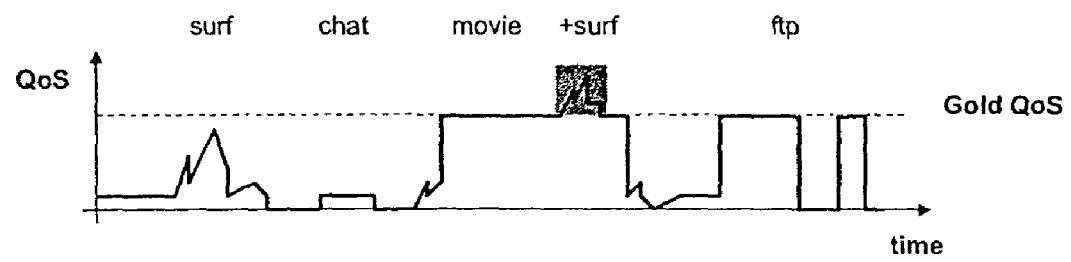
FIG. 2 is a schematic diagram of a prior-art method for allocating network resources illustrating the solution with a Gold QoS.
Figure 3:
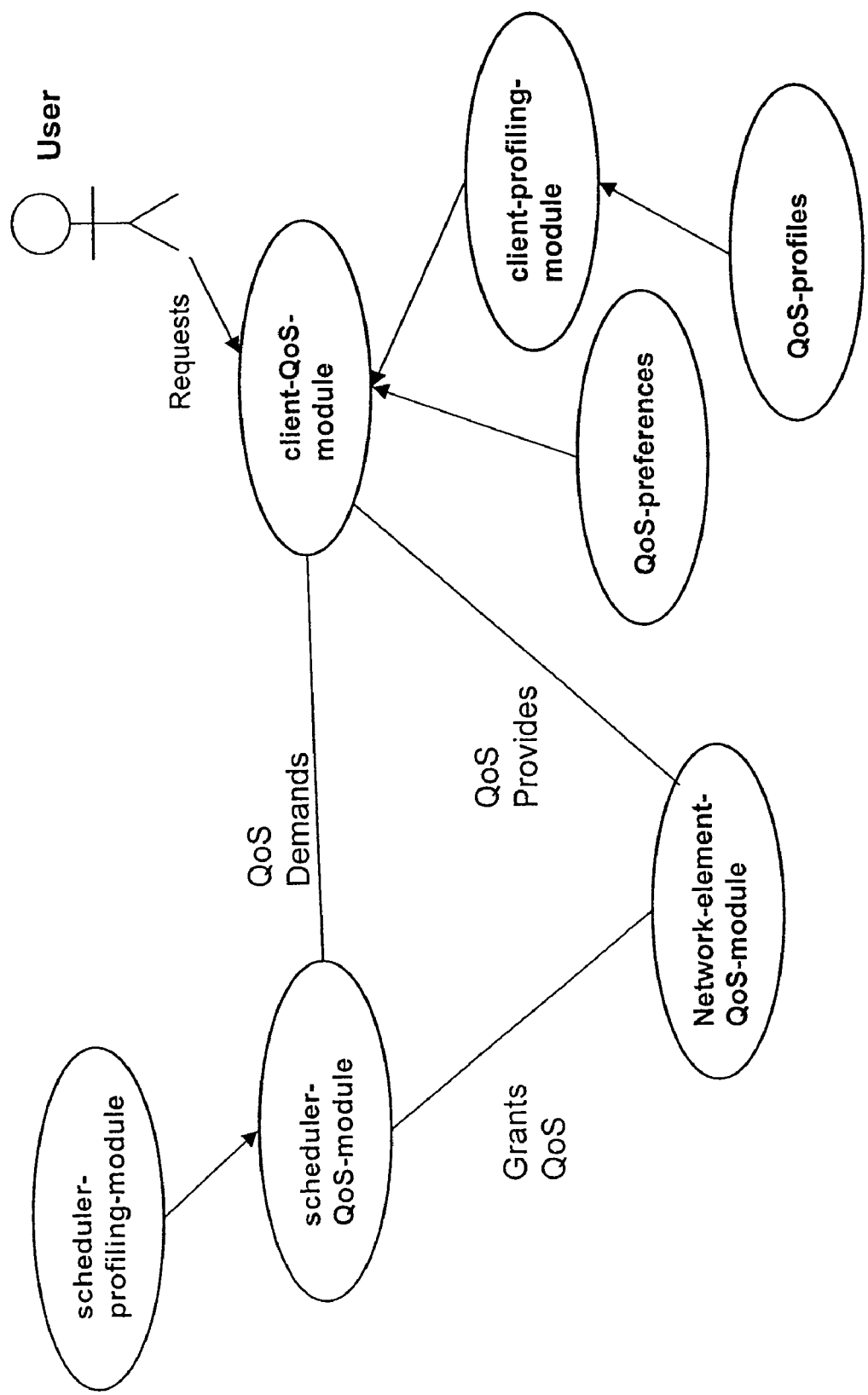
FIG. 3 is a schematic drawing showing a use case diagram (according to The Unified Modeling Language User Guide, Booch et. al., Addison Wesley, 1999, Chapter 17) of the relationship between interacting components managing QoS resources and demands according to the invention.
Figure 4:
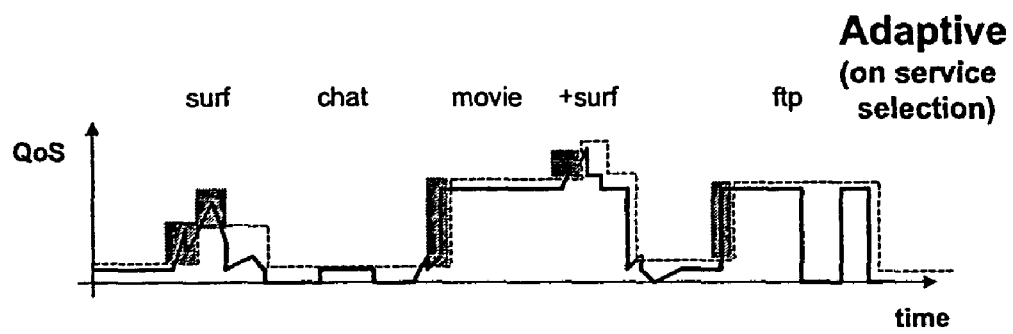
FIG. 4 is a schematic diagram illustrating the invention where QoS is adaptive managed based on service selections.
Figure 5:
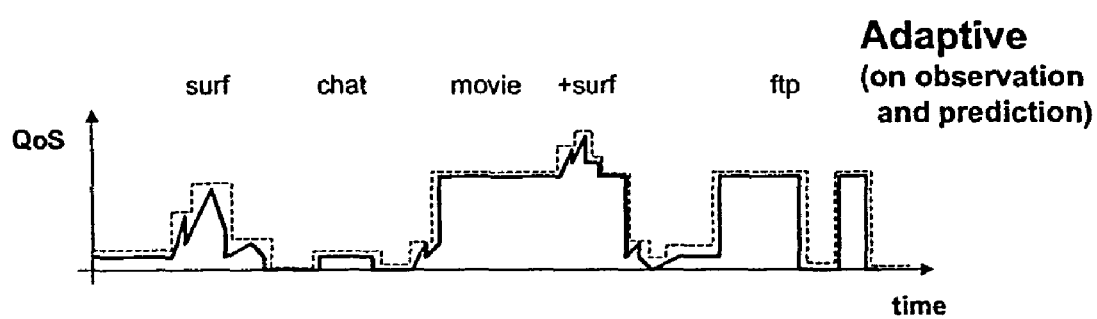
FIG. 5 is a schematic diagram illustrating the invention where QoS is adaptive managed based on observation of user behavior and prediction.

Those of ordinary skill in the art will realize that the following description of the present invention is illustrative only and is not intended to be in any way limiting. Other embodiments of the invention will readily suggest themselves to such skilled persons from an examination of the following disclosure.

The scheduler might work according to the following rule-chain. The error-rate is measured (prediction versus user correction) and collected through the network by the QoS scheduler for all users. The profiles of the neural networks are corrected (batch processing) through an update over the network by the QoS scheduler.

The preferences might for example comprise the following strategies each defining a granularity of scheduling:

User demand might be an optimization that promises the user the optimal bandwidth when needed, while reducing the QoS demand when not necessary.

Pro-actively might use the event stream to predict a demand.

User-profile and user-population might perform a comparison revealing that other users with similar profiles demand a guaranteed bandwidth when accessing a certain network resource. The system will/can upgrade the user experience accordingly.

Static preferences might define a service as requiring a high QoS. The user has a preference annotate dialog for marking a service demanding certain QoS.

The invention can be used in a collaborative distributed environment. That means the scheduler functionality as well as the client functionality and network element functionality might be realized as a distributed system. For the readers convenience the decomposition is described in a hardware centric fashion binding functionality to network nodes, i.e., hardware entities. It might be preferable to enhance certain network management components or even to distribute components over the network as mobile agents. The shown architecture is for illustrating purposes only.

What is claimed is:

1. A method for allocating network resources by just-in-time modulation of quality of service (QoS), comprising:
   receiving a user profile from a client terminal, said user profile comprising aggregated user behavior information recorded at said client terminal;
   receiving QoS demands from said client terminal, said QoS demands determined based on said user profile;
   allocating network resources to said client terminal based on said QoS demands.

2. The method according to claim 1, wherein the method is performed according to QoS user preferences.

3. The method according to claim 2, wherein said QoS user preferences specify a QoS demanding strategy.

4. The method according to claim 1, wherein said OoS demands are predicted by a neural network.

5. The method according to claim 4, wherein said prediction is based on said aggregated service usage and user behavior information recorded at said client terminal.

6. The method according to claim 1, further comprising coordinating concurrent QoS demands of a manifold of users.

7. The method according to claim 1, wherein coordinating concurrent QoS demands of a manifold of users comprises evaluating QoS demands of a manifold of users, and balancing QoS grants based on QoS user profiles of said manifold of users.

8. A telecommunication network, comprising:
a client terminal and a scheduler server, said client terminal comprising communication means for requiring and using network resources and quality of service (QoS) demands, said scheduler server comprising scheduling or dispatching means allocating network resources based on QoS demands;
wherein the client terminal further comprises acquiring means for recording events of a user as user-behavior and aggregation means for aggregating user-behavior in a QoS user profile;
wherein the communication means comprises demanding means for demanding predicted quality of service (QoS) demands based on service-usage and said user-behavior; and
wherein said scheduling or dispatching means comprises coordinating means for coordinating concurrent QoS demands of a manifold of users and evaluation and balancing means for evaluating QoS demands and balancing QoS grants based on QoS user profiles comprising aggregated service-usage and user-behavior received from a client terminal.

9. A client terminal comprising:
communication means for requiring and using network resources and quality of service (QoS) demands;
wherein the client terminal further comprises acquiring means for recording events of a user as user-behavior and aggregation means for aggregating user-behavior in a QoS user profile; and
wherein the communication means comprises demanding means for demanding predicted QoS demands based on service-usage and said user-behavior.

10. The client terminal according to claim 9, further comprising further communication means for providing the QoS user profiles to a scheduler server.

11. A scheduler server comprising:
scheduling or dispatching means for allocating network resources based on QoS demands, wherein said scheduling or dispatching means comprises coordinating means for coordinating concurrent QoS demands of a manifold of users and evaluation and balancing means for evaluating QoS demands and balancing QoS grants based on QoS user profiles comprising aggregated service-usage and user-behavior received from a client terminal.

12. A computer software product for allocating network resources by just-in-time modulation of quality of service (QoS), the computer software product comprising computer-executable instructions stored on a physical computer-readable medium, said instructions for performing the method according to claim 1.

* * * * *